United States Patent
Deshpande et al.

(10) Patent No.: US 11,714,391 B2
(45) Date of Patent: *Aug. 1, 2023

(54) SYSTEMS AND METHODS FOR CONTROLLING A BUILDING MANAGEMENT SYSTEM

(71) Applicant: Johnson Controls Tyco IP Holdings LLP, Milwaukee, WI (US)

(72) Inventors: Sandeep Dinkar Deshpande, Pune (IN); Kaustubh Devasthali, Mumbai (IN); Prathamesh Sunil Yadav, Pune (IN); Rajesh Nayak, Vidyaratna Nagar Manipal (IN)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 94 days.

This patent is subject to a terminal disclaimer.

(21) Appl. No.: 17/353,181

(22) Filed: Jun. 21, 2021

(65) Prior Publication Data

US 2021/0389742 A1 Dec. 16, 2021

Related U.S. Application Data

(63) Continuation of application No. 16/239,030, filed on Jan. 3, 2019, now Pat. No. 11,042,139.

(51) Int. Cl.
G05B 19/042 (2006.01)
F24F 1/00 (2019.01)

(52) U.S. Cl.
CPC .... *G05B 19/042* (2013.01); *G05B 2219/2614* (2013.01)

(58) Field of Classification Search
CPC .................. G05B 19/042; F24F 1/00
See application file for complete search history.

(56) References Cited

U.S. PATENT DOCUMENTS

| | | |
|---|---|---|
| 9,128,472 B2 | 9/2015 | Lawson et al. |
| 9,477,936 B2 | 10/2016 | Lawson et al. |
| 9,612,585 B2 | 4/2017 | Aggarwal et al. |
| 9,709,978 B2 | 7/2017 | Asenjo et al. |
| 11,042,139 B2 * | 6/2021 | Deshpande .......... G05B 19/042 |
| 2012/0150707 A1 | 6/2012 | Campbell et al. |
| 2015/0120015 A1 | 4/2015 | Fadell et al. |

(Continued)

*Primary Examiner* — Mark A Connolly
(74) *Attorney, Agent, or Firm* — Foley & Lardner LLP

(57) ABSTRACT

A Building Management System (BMS) includes a plurality of building subsystems and communications interface. The building subsystems include device(s) for controlling aspect (s) of the building subsystem. The communications interface receives commands from a cloud-based controller and a local client device. The commands from the cloud-based controller and local client device are structured to modify setting(s) for a device of the building subsystems. A BMS controller receives, via the communications interface from the cloud-based controller, a command for modifying a setting of a device for a first building subsystem. The BMS controller identifies a local setting of the device provided by the local client device. The BMS controller identifies a priority of the command from the cloud-based controller in relation to a priority of the local setting. The BMS controller controls the device based on the respective priorities.

20 Claims, 6 Drawing Sheets

(56) References Cited

U.S. PATENT DOCUMENTS

| | | |
|---|---|---|
| 2016/0182309 A1 | 6/2016 | Maturana et al. |
| 2018/0167229 A1 | 6/2018 | Brun et al. |
| 2018/0191197 A1 | 7/2018 | Carr et al. |
| 2018/0219697 A1 | 8/2018 | Propp |
| 2019/0107830 A1 | 4/2019 | Duraisingh et al. |

* cited by examiner

SYSTEMS AND METHODS FOR CONTROLLING A BUILDING MANAGEMENT SYSTEM

CROSS-REFERENCE TO RELATED APPLICATIONS

This application is a continuation of U.S. patent application Ser. No. 16/239,030, filed Jan. 3, 2019, the contents of which are incorporated herein by reference in its entirety.

BACKGROUND

The present disclosure relates generally to building management systems and more particularly to controlling devices within a building management system.

A building typically includes various building subsystems. Examples of such building subsystems include, for instance, an HVAC subsystem, a security subsystem, a lighting subsystem, and so forth. Each of the building subsystems may include a number of device(s) for controlling various aspects of the respective building subsystem.

Some building subsystems may be configured for remote monitoring and control. Such systems may not adequately take into consideration local situations and preferences which would otherwise be reflected through local control of the building subsystem. Similarly, some building subsystems may be configured for local monitoring and control. Such systems may not be configured for adequate optimization. Additionally, such systems may not provide an adequate representation to an enterprise of each individual building in the enterprise's portfolio.

SUMMARY

One implementation of the present disclosure is a building management system. The system includes a plurality of building subsystems within a building. Each of the building subsystems include at least one device for controlling one or more aspects of the building subsystem. The system includes a communications interface configured to receive commands from a cloud-based controller and commands from a local client device. The commands from the cloud-based controller and the local client device are structured to modify one or more settings for a respective device of the building subsystems. The system includes a building management system (BMS) controller communicably coupled to the building subsystems and the communications interface. The BMS controller includes a processing circuit including a processor and memory. The memory stores instructions that, when executed by the processor, cause the processor to perform operations. The operations include receiving, via the communications interface from the cloud-based controller, a command for implementing a cloud-based setting for a device in a first building subsystem. The operations include determining a priority of the cloud-based setting in relation to a priority of a local setting. The operations include controlling the device based on the priority of the cloud-based setting in relation to the priority of the local setting.

In some embodiments, the local setting is an emergency setting. Controlling the device based on the priority of the cloud-based setting in relation to the priority of the local setting includes controlling the device to have the local emergency setting. The local emergency setting has a higher priority than the priority of the cloud-based setting.

In some embodiments, the local setting is an emergency setting and the cloud-based setting is an optimization setting. Controlling the device based on the priority of the cloud-based setting in relation to the priority of the local setting includes controlling the device to have the local emergency setting. The local emergency setting has a higher priority than the optimization setting.

In some embodiments, the cloud-based setting is an optimization setting. Controlling the device based on the priority of the cloud-based setting in relation to the priority of the local setting includes controlling the device to have the optimization setting. The optimization setting has a higher priority than the priority of the local setting.

In some embodiments, controlling the device based on the priority of the cloud-based setting in relation to the priority of the local setting includes determining a duration in which the device had the local setting. Controlling the device may further include assigning, based on the duration, a null value to the local setting. Controlling the device may further include controlling the device to have the cloud-based setting.

In some embodiments, the communications interface comprises a gateway configured to listen for commands from a message broker. The cloud-based controller routes the commands to the BMS controller via the gateway through the message broker. The operations may further include communicating a status update message from the BMS controller to the gateway for transmission to the cloud-based controller via the message broker. The status update message causes a user interface corresponding to the cloud-based controller to be updated to reflect modification of the device.

In some embodiments, controlling the device based on the priority of the cloud-based setting in relation to the priority of the local setting includes controlling the device to have the local setting. The status update message indicates that the cloud-based setting was not executed because the priority of the local setting is greater than the priority of the cloud-based setting.

In some embodiments, controlling the device based on the priority of the cloud-based setting in relation to the priority of the local setting includes controlling the device to have the cloud-based setting. The status update message indicates successful execution of the cloud-based setting.

In some embodiments, the command from the cloud-based controller is structured according to a selected communications protocol from a plurality of communications protocols. The communications interface is configured to receive commands structured according to the selected communications protocol.

Another implementation of the present disclosure is a method of controlling a building management system. The method includes receiving, via a communications interface configured to receive commands from a cloud-based controller and commands from a local client device, a command for implementing a cloud-based setting of a device for a first building subsystem. The commands from the cloud-based controller and the local client device are structured to modify one or more settings for a respective device of a building subsystem. The building subsystem is one of a plurality of building subsystems for a building. The method includes determining a priority of the cloud-based setting in relation to a priority of a local setting. The method includes controlling the device based on the priority of the cloud-based setting in relation to the priority of the local setting.

In some embodiments, the local setting is an emergency setting. Controlling the device based on the priority of the cloud-based setting in relation to the priority of the local setting includes controlling the device to have the local emergency setting. The local emergency setting has a higher priority than the priority of the cloud-based setting.

In some embodiments, the local setting is an emergency setting and the cloud-based setting is an optimization setting. Controlling the device based on the priority of the cloud-based setting in relation to the priority of the local setting includes controlling the device to have the local emergency setting. The local emergency setting has a higher priority than the optimization setting.

In some embodiments, the cloud-based setting is an optimization setting. Controlling the device based on the priority of the cloud-based setting in relation to the priority of the local setting includes controlling the device to have the optimization setting. The optimization setting has a higher priority than the priority of the local setting.

In some embodiments, controlling the device based on the priority of the cloud-based setting in relation to the priority of the local setting includes determining a duration in which the device had the local setting. Controlling the device may further include assigning, based on the duration, a null value to the local setting. Controlling the device may further include controlling the device to have the cloud-based setting.

In some embodiments, the communications interface includes a gateway configured to listen for commands from a message broker. The cloud-based controller routes the commands to the BMS controller via the gateway through the message broker. The method further includes communicating a status update message from the BMS controller to the gateway for transmission to the cloud-based controller via the message broker. The status update message causes a user interface corresponding to the cloud-based controller to be updated to reflect modification of the device.

In some embodiments, controlling the device based on the priority of the cloud-based setting in relation to the priority of the local setting includes controlling the device to have the local setting. The status update message indicates that the cloud-based setting was not executed because the priority of the local setting is greater than the priority of the cloud-based setting.

In some embodiments, controlling the device based on the priority of the cloud-based setting in relation to the priority of the local setting includes controlling the device to have the cloud-based setting. The status update message indicates successful execution of the cloud-based setting.

In some embodiments, the command from the cloud-based controller is structured according to a selected communications protocol from a plurality of communications protocols. The communications interface is configured to receive commands structured according to the selected communications protocol.

Another implementation of the present disclosure is a method of controlling a building management system from a remote location. The method includes receiving, via a user interface, a selection for modifying a setting of a device for a building subsystem in a building. The method includes communicating a command corresponding to the selection to a message broker for transmission to a gateway for a building management system (BMS) controller associated with the building. The BMS controller receives the command and selectively executes the command to modify the setting for the device based on a priority of the setting from the command in relation to a priority of a local setting for the device. The method includes receiving, from the BMS controller via the gateway, a status update message. The status update message indicates whether or not the command corresponding to selection was executed by the BMS controller. The method includes updating the user interface based on the status update message.

In some embodiments, the local setting is an emergency setting which has a higher priority than the setting from the command. The status update message indicates the command was not executed by the BMS. Updating the user interface based on the status update message includes updating the user interface to indicate the command was not executed because the priority of the local setting is greater than the priority of the setting from the command.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1:
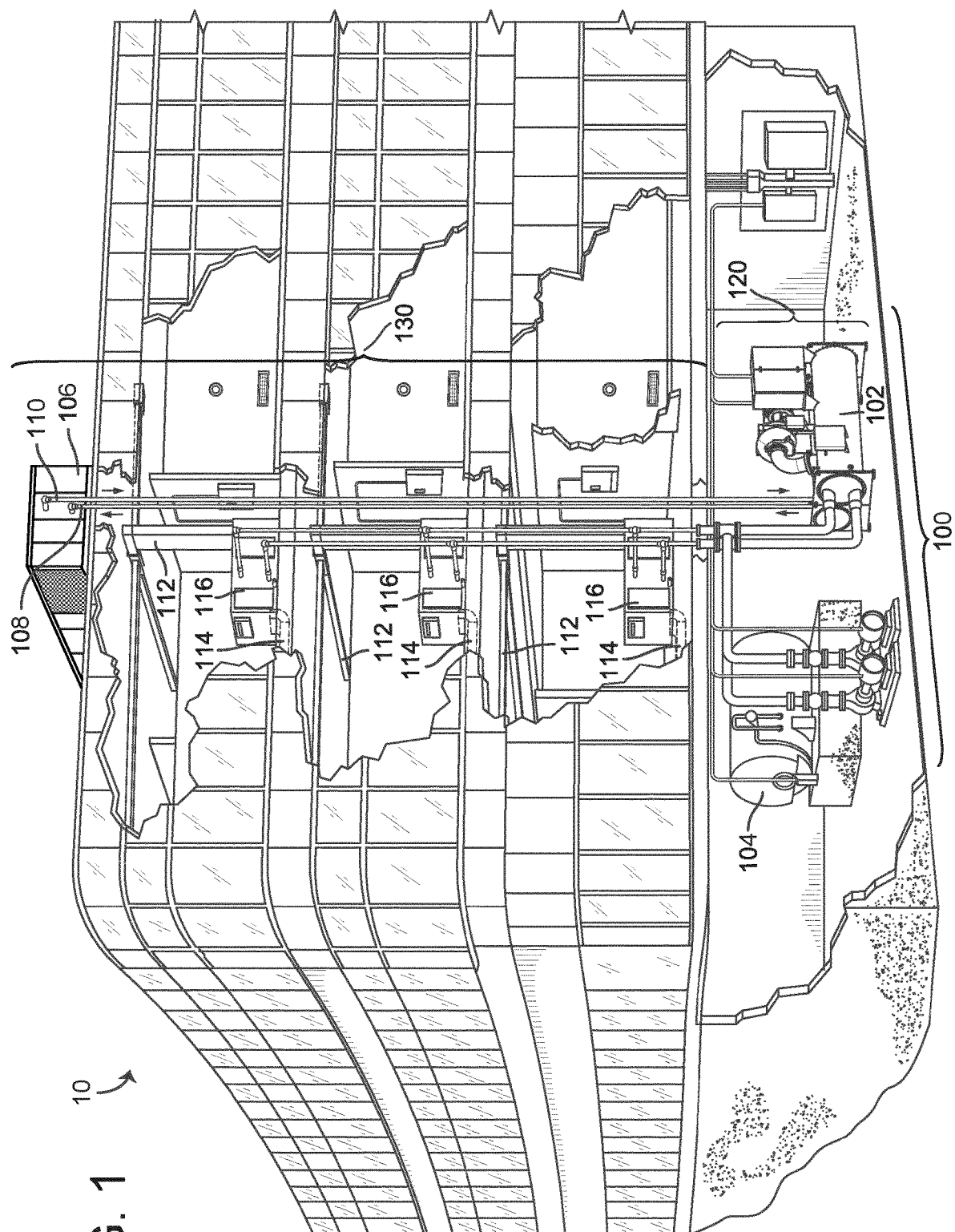
FIG. 1 is a drawing of a building equipped with a heating, ventilating, or air conditioning (HVAC) system and a building management system (BMS), according to an exemplary embodiment.

Referring generally to the FIGURES, systems and methods for building management solutions are shown, according to an exemplary embodiment. The systems and methods described herein may be used for controlling building management systems for a plurality of buildings spread across different geographies.

A building management system includes a plurality of building subsystems within a building. Each of the building subsystems include at least one device for controlling one or more aspects of the building subsystem. The building management system includes a communications interface configured to receive commands from a cloud-based controller and commands from a local client device. The commands from the cloud-based controller and the local client device are structured to modify one or more settings for a respective device of the building subsystems. The building management system includes a building management system (BMS) controller communicably coupled to the building subsystems and the communications interface. The BMS controller is configured to receive, via the communications interface from the cloud-based controller, a command for modifying a setting of a device for a first building subsystem. The BMS controller is configured to identify a local setting of the device which is provided by the local client device. The BMS controller is configured to determine a priority of the command from the cloud-based controller in relation to a priority of the local setting. The BMS controller is configured to control the device based on the priority of the command from the cloud-based controller in relation to the priority of the local setting.

The embodiments described herein provide a system and method for centralized control of enterprise building subsystems within a building portfolio. Further, the embodiments described herein provide for efficient and secure processing and execution of commands in real-time. The embodiments described herein provide for priority-based execution of commands to ensure dynamic switching of control between local and cloud-based control of building subsystems. The embodiments described herein provide a single interface for sending commands from a cloud-based controller to a communications interface (also referred to herein as a gateway) for a respective building in real-time. The embodiments described herein provide for controlling devices, such as lights, actuators, valves, etc., for various building subsystems from a remote location. The embodiments described herein provide for multi-protocol support with intelligent-based switching of protocols based on, for instance, bandwidth. The embodiments described herein provide for real-time notification of command status including, for instance, notifications of successful or unsuccessful execution of commands from a cloud-based controller. The embodiments described herein provide for dynamic switching of controls between a cloud-based controller and local client devices. Such embodiments provide for a single controller which controls BMS controllers spread across different geographies, buildings, etc. Such embodiments provide a failsafe mechanism where local operators can override and control from the remote source. Such embodiments provide a single solution and interface which is compatible across different BMS controllers for managing an enterprise. Various other benefits of the present disclosure will become apparent based on the disclosure below.

Building Management System and HVAC System

Referring now to FIGS. 1-4, an exemplary building management system (BMS) and HVAC system in which the systems and methods of the present disclosure may be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS may include, for example, an HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that may be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve set point conditions for the building zone.

Figure 2:
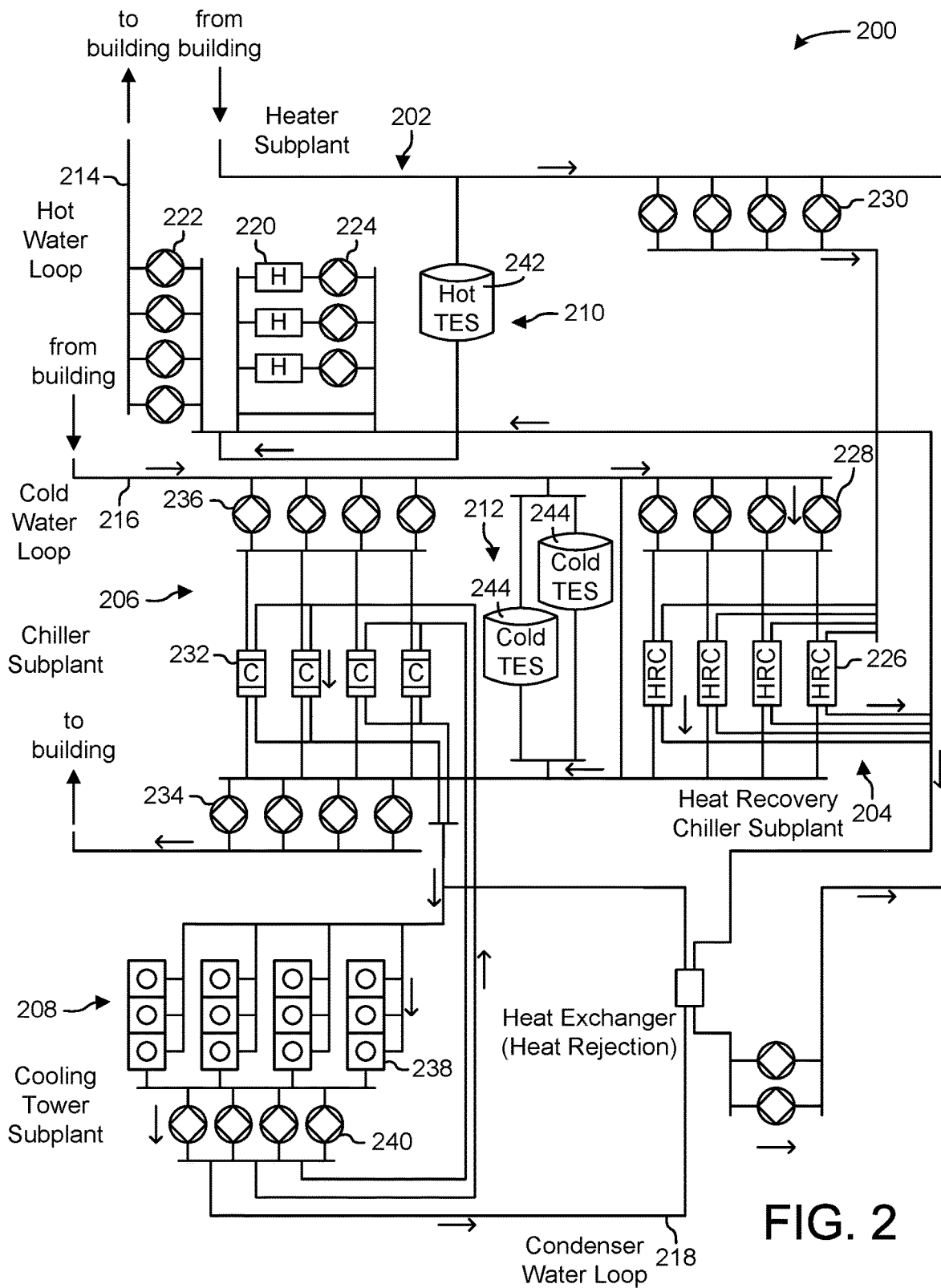
FIG. 2 is a schematic diagram of a waterside system which may be used to support the HVAC system of FIG. 1, according to an exemplary embodiment.

Referring now to FIG. 2, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 and building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
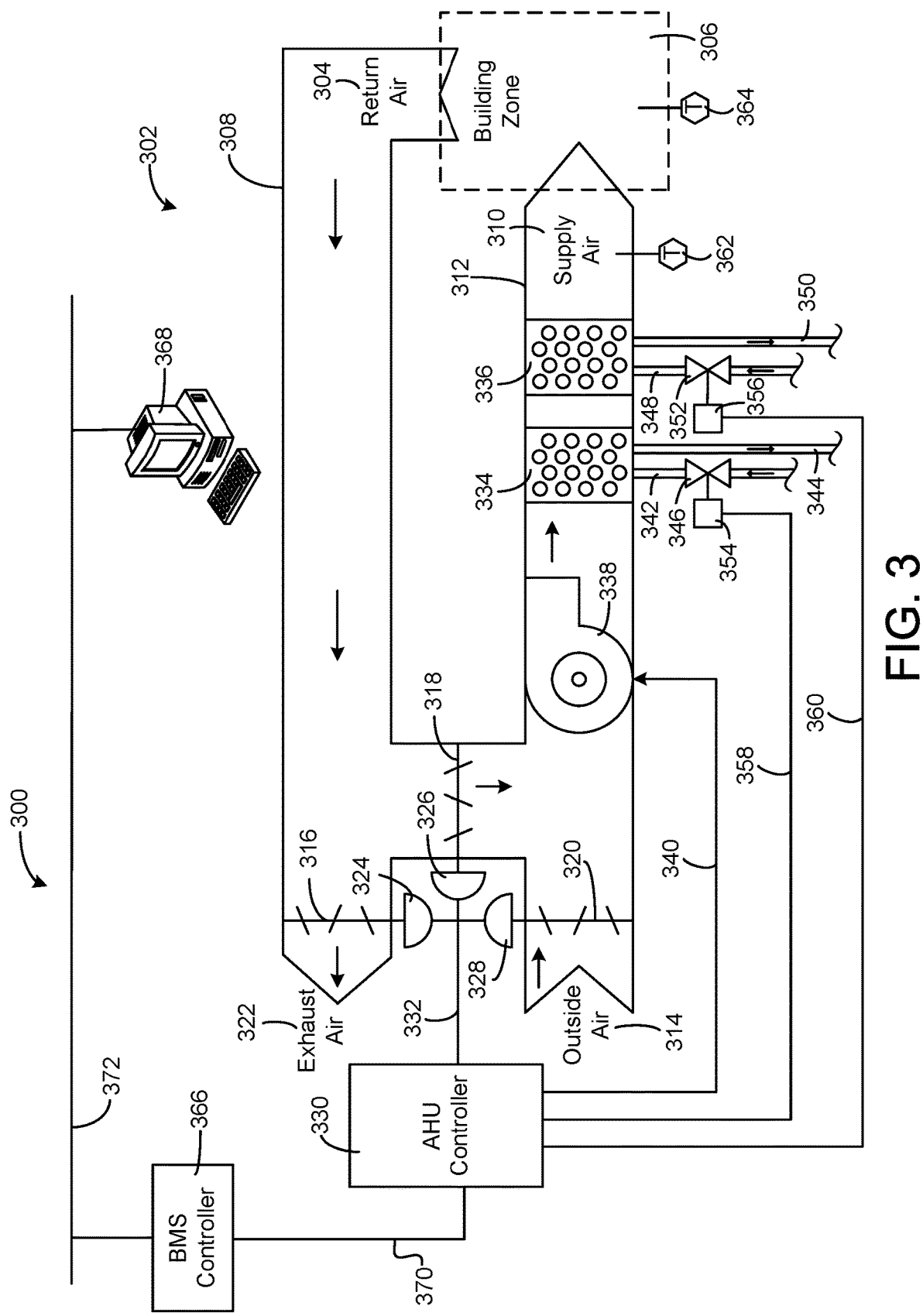
FIG. 3 is a block diagram of an airside system which may be used as part of the HVAC system of FIG. 1, according to an exemplary embodiment.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type AHU 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that may be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that may be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a BMS controller 366 and a client device 368. BMS controller 366 may include one or more computer systems (e.g., servers, supervisory controllers, subsystem controllers, etc.) that serve as system-level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that may be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
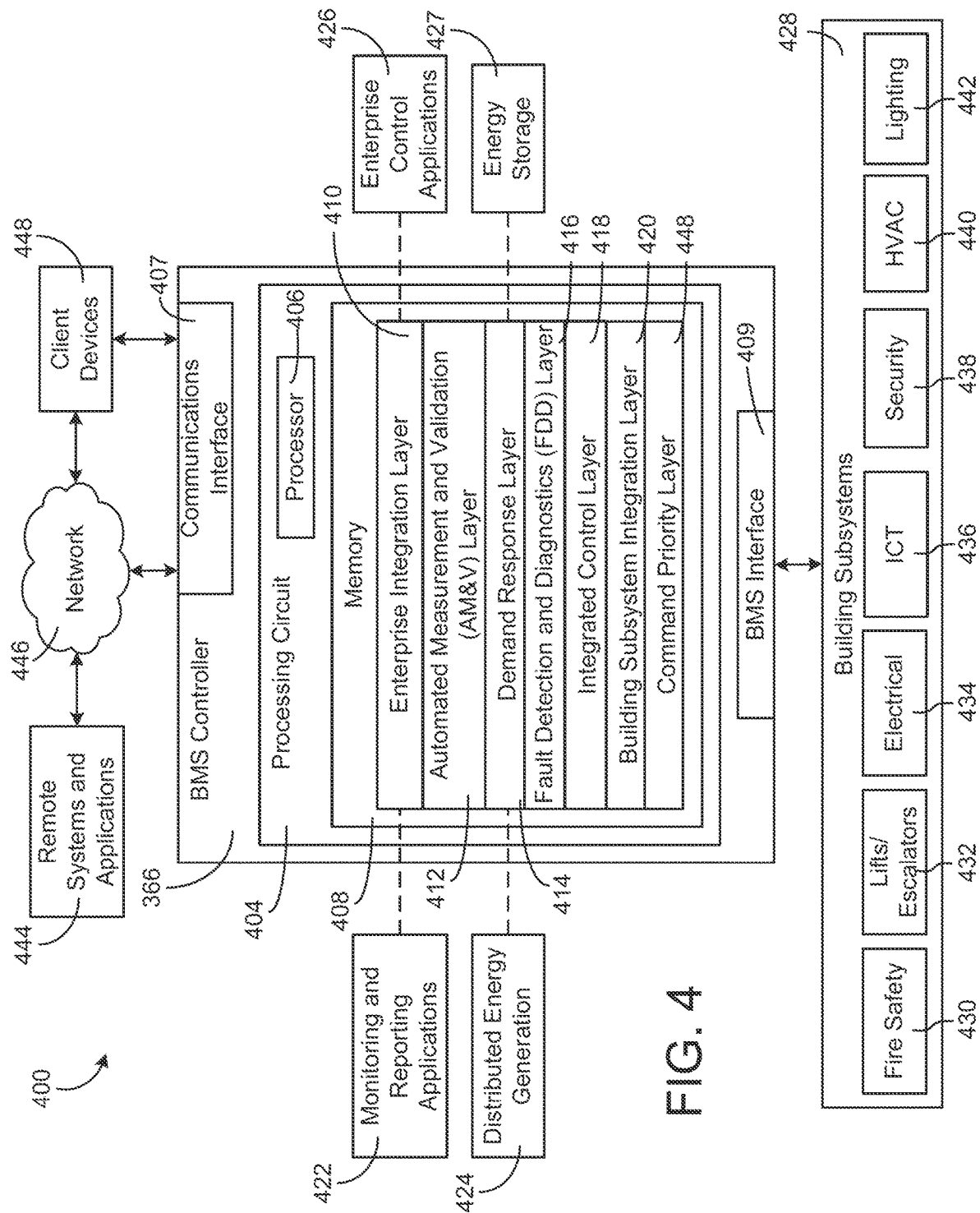
FIG. 4 is a block diagram of a BMS which may be implemented in the building of FIG. 1, according to an exemplary embodiment.

Referring now to FIG. 4, a block diagram of a BMS 400 is shown, according to an exemplary embodiment. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, an HVAC subsystem 440, a lighting subsystem 442, a lift/escalators subsystem 432, and a fire safety subsystem 430. In various embodiments, building subsystems 428 may include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include any number of chillers, heaters, handling units, economizers, field controllers, supervisory controllers, actuators, temperature sensors, and/or other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407 and 409 may be or may include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407 and 409 may be direct (e.g., local wired or wireless communications) or via a communications network 446 (e.g., a WAN, the Internet, a cellular network, etc.). For example, interfaces 407 and 409 may include an Ethernet card and port for sending and receiving data via an Ethernet-based communications link or network. In another example, interfaces 407 and 409 may include a Wi-Fi transceiver for communicating via a wireless communications network. In another example, one or both of interfaces 407 and 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof may send and receive data via interfaces 407 and 409. Processor 406 may be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers, and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments, BMS controller 366 may be distributed across multiple servers or computers (e.g., that may exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 may work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translates communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses may include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions may specify which equipment may be turned on or off in response to particular demand inputs, how long a system or piece of equipment should be turned off, what setpoints may be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 may integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions may be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and AM&V layer 412. Integrated control layer 418 may be configured to provide calculated inputs (e.g., aggregations) to these higher levels based on outputs from more than one building subsystem.

AM&V layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

FDD layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes may be examined by FDD layer 416 to expose when the system begins to degrade in performance and alert a user to repair the fault before it becomes more severe.

Systems and Methods for Controlling a BMS

Figure 5:
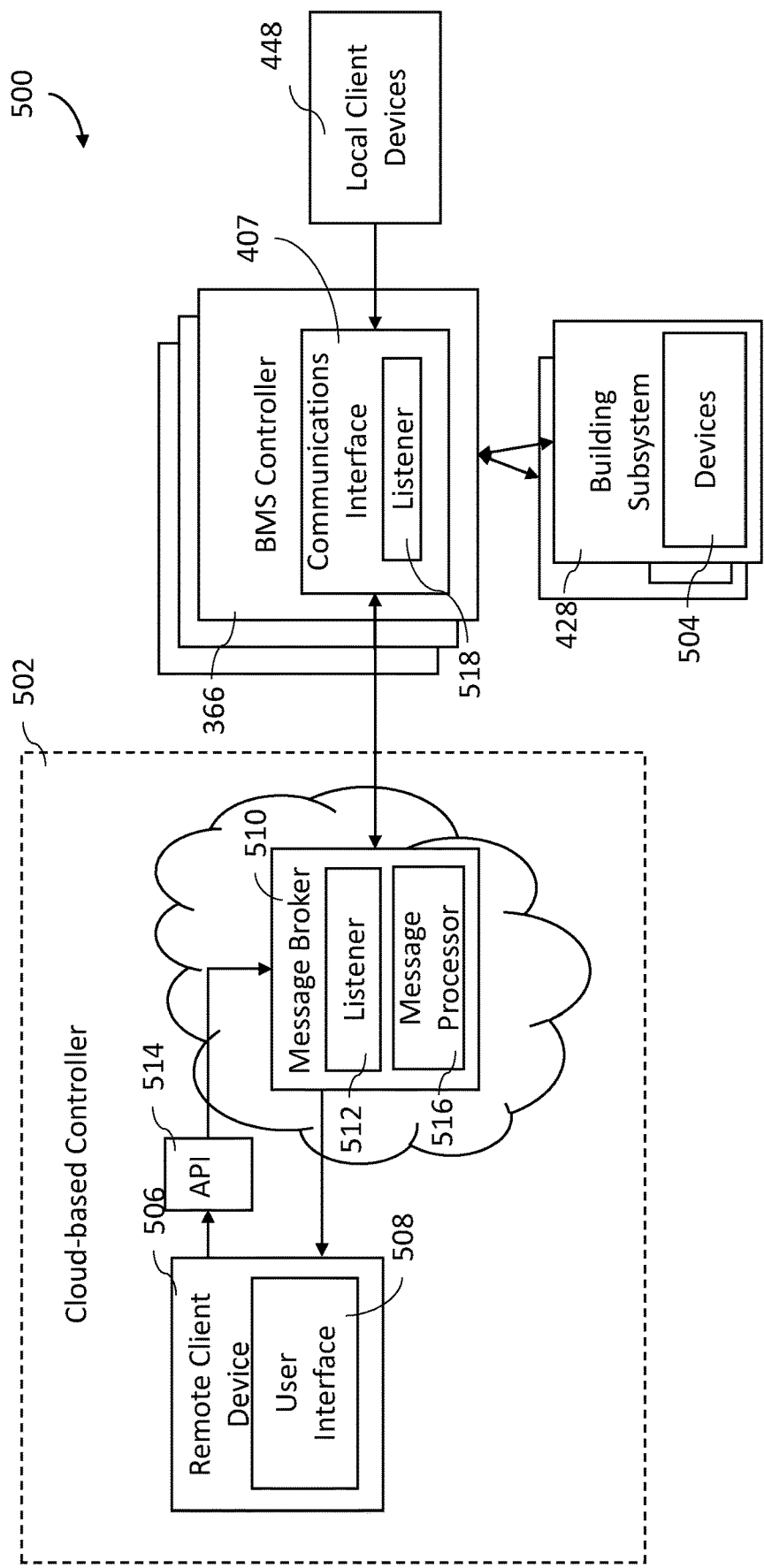
FIG. 5 is a block diagram of a system for controlling the BMS of FIG. 4 for a plurality of buildings, according to an exemplary embodiment.

Referring to FIG. 5, depicted is a block diagram of a system 500 for controlling the BMS 400 of a plurality of buildings. The system 500 is shown to include a cloud-based controller 502. As described in greater detail below, the cloud-based controller 502 may be configured to communicate control signals for controlling a BMS 400 for a plurality of buildings. The cloud-based controller 502 may be configured to communicate commands to the BMS controller 366 for a BMS 400 for a target building. The communications interface 407 of the BMS controller 366 receives the commands from the cloud-based controller 502. The BMS controller 366 selectively executes the commands based on, among other things, the priority of the command.

In some implementations of building management solutions, facilities and buildings within a building portfolio for an enterprise are monitored independently, as the facilities and buildings are located in disparate locations and geographies. Hence, monitoring and controlling the flow of all available resources may not be feasible. In some implementations, building management solutions are not configured for monitoring and controlling the flow from both a remote source and a local source. For instance, some implementations are configured for either local source monitoring and control or remote source monitoring and control. Where building management solutions are configured for remote source monitoring and control, such a remote source may not be adapted for identifying, for instance, local emergencies which are better suited for identification via a local operator. Where building management solutions are configured for local source monitoring and control, such a local source may not be adapted for optimization of the building subsystems for the building.

The embodiments described herein provide a system and method for centralized control of enterprise building subsystems within a building portfolio. Further, the embodiments described herein provide for efficient and secure processing and execution of commands in real-time. The embodiments described herein provide for priority-based execution of commands to ensure dynamic switching of control between local and cloud-based control of building subsystems. The embodiments described herein provide a single interface for sending commands from a cloud-based controller to a communications interface (also referred to herein as a gateway) for a respective building in real-time. The embodiments described herein provide for controlling devices, such as lights, actuators, valves, etc., for various building subsystems from a remote location. The embodiments described herein provide for multi-protocol support with intelligent-based switching of protocols based on, for instance, bandwidth. The embodiments described herein provide for real-time notification of command status including, for instance, notifications of successful or unsuccessful execution of commands from a cloud-based controller. The embodiments described herein provide for dynamic switching of controls between a cloud-based controller and local client devices. Such embodiments provide for a single controller which controls BMS controllers spread across different geographies, buildings, etc. Such embodiments provide a failsafe mechanism where local operators can override and control from the remote source. Such embodiments provide a single solution and interface which is compatible across different BMS controllers for managing an enterprise. Various other benefits of the present disclosure will become apparent based on the disclosure below.

Still referring to FIG. 5, the system 500 is shown to include a cloud-based controller 502. The cloud-based controller 502 may be or include any device, component, or group of devices or components configured to transmit commands to a BMS controller 366 for a respective building, such as building 10. An enterprise may have a plurality of buildings 10 in a portfolio. Each building 10 may include respective building subsystems 428 (for instance, a fire safety subsystem 430, lifts/escalators subsystem 432, electrical subsystem 434, ICT subsystem 436, security subsystem 438, HVAC subsystem 440, lighting subsystem 442). Each of the building subsystems 428 may include respective devices 504 which are configured for control via the cloud-based controller 502.

The cloud-based controller 502 may include (or be communicably coupled to) a remote client device 506. The remote client device 506 may be or include a centralized computing device, client device, etc., which is configured to control various BMS controllers 366 for the respective buildings. The remote client device 506 may be configured to render a user interface 508 for receiving user inputs (or requests) for controlling the BMS controllers 366. As described in greater detail below, the remote client device 506 may be configured to communicate commands to the BMS controller 366 for controlling the BMS controller 366. The remote client device 506 may be configured to receive feedback, or status update messages, from the BMS controller 366.

In some embodiments, the remote client device 506 may be configured to automatically generate commands for controlling the BMS controller 366. The remote client device 506 may be configured to automatically generate the commands based on, for instance, various artificial intelligence algorithms, optimization techniques, etc., for the devices 504 in the respective building subsystems 428. In some embodiments, the remote client device 506 may be configured to generate commands for controlling the BMS controller 366 based on requests from an operator (e.g., received via the user interface 508).

The remote client device 506 may be configured to render, on the user interface 508, a status of the buildings 10, building subsystems 428, devices 504 within the building subsystems 428, etc. An operator located remotely from the buildings 10 may navigate the user interface 508 to identify the status of various buildings 10, subsystems 428 within a respective building 10, and devices 10 within a respective subsystem 428. For instance, the user interface 508 may initially render a listing of each of the buildings 10. The operator may select a specific building 10 on the user interface 508. The remote client device 506 may modify the user interface 508 to display each of the building subsystems 428 for the selected building 10. The operator may select a specific building subsystem 428 on the user interface 508. The remote client device 506 may modify the user interface 508 to display each of the devices 504 for the selected building subsystem 428. The user interface 508 may include status information corresponding to each of the devices 504. The status information may include, for instance, current settings. As described in greater detail below, the devices 504 may communicate status information, status update messages, etc., to the remote client device 506 in real-time or near real-time. Each of the commands may contain settings having a priority.

The remote client device 506 may be configured to optimize settings for various devices 504 in the building subsystems 428. The remote client device 506 may be configured to optimize the settings based on criteria. As one example, the remote client device 506 may apply a cost function to criteria to identify solution(s) for the optimization problem. The criteria may include, for instance, a cost saved due to energy optimization achieved through automated control (e.g., via the remote client device 506). The criteria may include, for instance, criticality of the points or nodes associated with the devices 504 being controlled. As one example, in a building containing equipment which produces a significant amount of heat, devices 504 within the HVAC subsystem 440 may be critical for comfort but may increase cooling costs. The remote client device 506 may apply various AI techniques and machine learning algorithms (as one non-limiting example, a cost function) to identify solutions which optimize settings based on various criteria. The settings generated by the remote client device 506 may be assigned a priority for execution by the BMS controller 366, as described in greater detail below.

Table 1 depicted below shows an example hierarchy of priorities which may be assigned to a setting for a device 504. Commands may be structured as 16 cells. The remote client device 506 and/or local client device 448 may insert a setting for the device 504 to a particular cell to assign the setting the priority to the cell. As can be seen below, first and second priority are given to life safety devices (such as fire suppressant devices), third and fourth priority are available (e.g., for inserting a setting into the cell), the fifth priority is given to critical equipment control, the sixth priority is given to a minimum on or off value for the device, the seventh priority is available, the eighth value is given for manual operation (e.g., by the local client device 448, by the remote client device 506, etc.), and the remaining cells may be available.

TABLE 1

Hierarchy of Priorities for a Setting

| Priority level | Application |
|---|---|
| 1 | Manual-Life Safety |
| 2 | Automatic-Lite Safety |
| 3 | Available |

TABLE 1-continued

Hierarchy of Priorities for a Setting

| Priority level | Application |
|---|---|
| 4 | Available |
| 5 | Critical Equipment Control |
| 6 | Minimum On/Off |
| 7 | Available |
| 8 | Manual Operator |
| 9 | Available |
| 10 | Available |
| 11 | Available |
| 12 | Available |
| 13 | Available |
| 14 | Available |
| 15 | Available |
| 16 | Available |

In some embodiments, the remote client device 506 may be configured to automatically (or default) writing a setting to have a particular priority level. For instance, the remote client device 506 may default to settings having a priority of nine. In this regard, settings which are written (e.g., by the local client device 448 or remote client device 506) may have default priorities. In some embodiments, the remote client device 506 and/or local client device 448 may be configured to overwrite settings to a particular priority. For instance, the remote client device 506 and/or local client device 448 may be configured to replace a current setting with a different setting having the same priority. In some embodiments, the remote client device 506 and/or local client device 448 may be configured to select an available priority in which to write a setting for a device 504 based on the priority of the current setting for the device 504. Various examples are provided below for purposes of illustration. However, the present disclosure is not limited to any of these particular examples.

As one example, the cloud-based controller 502 may be configured to select a setting to optimize a device in the HVAC subsystem 440. For instance, the cloud-based controller 502 may be configured to select a setting for an actuator which controls a valve for a damper in the HVAC subsystem 440. The cloud-based controller 502 (e.g., the remote client device 506) may be configured to calculate the settings for the actuator to optimize settings for the valve. An operator may have previously left open the valve (e.g., to open the damper 100%) to cool a particular space by assigning a setting using the local client device 448 for the valve. The setting for the valve may have a priority of eight (corresponding to manual operation). The remote client device 506 may optimize the settings based on the cost saved and criticality of the point. The remote client device 506 may determine that the damper was open for an extended duration beyond working hours (e.g., the operator inadvertently left open the damper) based on the duration in which the setting for the valve was assigned by the local client device 448. The remote client device 506 may be configured to overwrite the current setting for the valve (e.g., assigned to priority eight) with a null value, effectively bypassing the current setting. The remote client device 506 may be configured to assign a priority of nine to the new optimization setting. Since the new optimization setting has a priority of nine and the current setting at priority eight is now null, the new optimization setting has the highest priority. Where an operator at the building wants to override the optimization setting, the operator provides a manual setting to the manual override priority (e.g., priority nine), effectively overriding the optimization setting by providing a manual setting with a higher priority than the optimization setting. Such embodiments provide a seamless and systematic system for switching between cloud-based and local control.

Continuing the previous example, in some instances, the remote client device 506 may temporarily bypass the setting from the local client device 448. For instance, the remote client device 506 may temporarily bypass the setting from the local client device 448 outside working hours. The remote client device 506 may store the setting from the local client device 448 (e.g., in local memory for the remote client device 506). The remote client device 506 may be configured to temporarily replace the setting from the local client device 448 with a null value. Once working hours continue (or a predetermined duration prior to beginning of working hours for the building 10), the remote client device 506 may be configured to retrieve the settings stored in local memory and replace the null value at priority eight with the stored settings, thus bypassing the settings previously provided by the remote client device 506.

As another example, the remote client device 506 may have a default setting for a valve which controls a fire damper in the fire safety subsystem 430. The default setting may be assigned priority nine. The valve's default position may correspond to a position in which the fire damper is normally open. During an emergency situation, the fire damper may be closed by corresponding settings for the valve, which contains a fire. During a fire, an operator may use the local client device 448 to override the default settings from the remote client device 506 to close the fire damper. The operator may assign the setting a priority of one (e.g., manual life safety). Such embodiments may indicate that the setting is an emergency setting.

While these examples are provided, various other examples are contemplated as falling within the scope of the present disclosure. For instance, each of the building subsystems 428 shown in FIG. 4 may have devices which can be controlled through optimization (e.g., via the cloud-based controller) and through manual control or other BMS control via the BMS controller 366. The embodiments described herein provide systems and methods for seamlessly switching between cloud-based control and local control. In some embodiments, at each instance where a command for changing a setting is issued (e.g., from the local client device 448 and/or remote client device 506), the command may be communicated to each of the client devices (e.g., the local client device 448 and remote client device 506) within the system 500, as discussed in greater detail below. Such embodiments may provide an indication of current settings for each of the devices in the building subsystems 428 to each of the respective client devices.

The cloud-based controller 502 may include a message broker 510. The message broker 510 may be designed or implemented to receive messages, commands, or other data from a source, such as the remote client device 506, and relay those messages to a destination, such as the BMS controllers 366. In some embodiments, the message broker 510 may be configured to receive data according to a plurality of protocols. For instance, the message broker 510 may be configured to receive data according to a protocol (such as Advanced Message Queuing Protocol (AMQP)) adapted for or configured for use in a high bandwidth environment and data according to a protocol (such as Message Queuing Telemetry Transport (MQTT) protocol) adapted for or configured for use in a medium to low bandwidth environment. As one non-limiting example, the message broker 510 may be Rabbit MQ message broker developed by Pivotal Software. The message broker 510 may include a listener 512. The listener 512 may be designed or implemented to identify, detect, or otherwise receive data from one or more sources (such as the remote client device 506, BMS controllers 366, etc. The listener 512 may be configured to receive messages according to the various protocols described above.

The remote client device 506 may be designed or configured to provide commands to the message broker 510. The remote client device 506 may be configured to select the protocol in which the commands are structured. The remote client device 506 may be configured to select the protocol based on bandwidth of the building 10 in which the target device 504 is located. For instance, some buildings 10 may be located in a geographic area in which a large bandwidth is not available, some buildings 10 may not require a large bandwidth (due to fewer building subsystems 428, fewer devices 504 configured for control, etc.) Hence, some buildings 10 may use a larger bandwidth in comparison to other buildings 10 in a portfolio for a given enterprise. The remote client device 506 may include or otherwise store data corresponding to the bandwidth for each of the buildings 10 in the enterprise portfolio. The remote client device 506 may be configured to select the protocol for a command for a target device 504 at a building 10 based on the data stored by the remote client device 506 corresponding to the building 10.

The cloud-based controller 502 may include an Application Programming Interface (API) 514. The API 514 may be or include an interface which defines how software components, such as the user interface 508 of the remote client device 506 and message broker 510, interact with one another. The API 514 may define the format or structure for exchange of data or commands between the user interface 508 and message broker 510. In some embodiments, the cloud-based controller 502 may include a plurality of APIs 514. For instance, the cloud-based controller 502 may include an API 514 for each protocol in which commands are delivered from the user interface 508 to the message broker 510. Each of the commands provided by the remote client device 506 may be structured to store various information. The commands may include the settings requested by the remote client device 506 for the device 504, identification information corresponding to the BMS controller 366 which controls the device 504, identification information corresponding to the device 504, among other data. The identification information may include, for instance, an internet protocol address or other address, unique identifier, PIN, or other type of information uniquely associated with a particular device and used for routing the commands to the particular device. Such identification information may be used for routing the command to the proper destination, as described in greater detail below.

The message broker 510 may include a message processor 516. The message processor 516 may be or include any device, component, or group of devices or components configured to process commands from a source (e.g., the remote client device 506), and route those commands to a destination (e.g., a BMS controller 366 for a target building 10). The message processor 516 may be configured to locate the identification information from the command. The message processor 516 may be configured to route, communicate, or otherwise deliver the command to the BMS controller 366 specified in the command based on the identification information contained in the command.

Referring now to FIG. 4 and FIG. 5, the BMS controller 366 may be configured to receive commands from the message broker 510 via the communications interface 407.

In some embodiments, the communications interface 407 may operate as or similarly to a gateway. The gateway may include a listener 518 (which may be similar in some aspects to listener 512 of the message broker 510). The gateway may act as an interface for exchanging communication and command signals between the cloud-based controller 502 and the BMS controller 366. The listener 518 may be communicably coupled to the message processor 516 (e.g., via a Secure Socket Layer (SSL) connection, as one non-limiting example). The listener 518 of the communications interface 407 may detect incoming commands from the message broker 410 of the cloud-based controller 502 and from the local client device 448.

The BMS controller 366 may be configured to selectively execute commands from the cloud-based controller 502 and the local client device 448. The BMS controller 366 may be configured to execute commands from the cloud-based controller 502 and local client device 448 based on a priority assigned to settings contained in the commands. The BMS controller 366 is shown to include a command priority layer 446. The command priority layer 446 may be similar in at least some aspects to the layers 410-420 described above. The command priority layer 446 may work together with some of the layers 410-420 described above (such as the demand response layer 414, integrated control layer 418, building subsystem integration layer 420, etc.)

The command priority layer 446 may be configured to determine a priority of commands received by the BMS controller 366 via the communications interface 407. The command priority layer 446 may be configured to determine the priority of a setting contained in a command. In some embodiments, the command priority layer 446 may be configured to determine the priority of the setting in relation to a priority assigned to the current setting of the device 504. The current setting of the device 504 may be listed, indicated, included, or otherwise provided within the command. The current setting of the device 504 may have a priority. The command may include another setting, which may also have a priority. The settings may each have different priorities, with one setting having a higher priority than another setting. The command priority layer 446 may be configured to determine which setting has the highest priority. The command priority layer 446 may be configured to control the device 504 corresponding to the command to modify the settings according to the priority of the settings within the command. The command priority layer 446 may be configured to apply the setting which has the highest priority to the device specified in the command.

The BMS interface 409 may be configured to route, transmit, distribute, or otherwise communicate a control signal to the device (e.g., device 504) specified in the command. The BMS interface 409 may be configured to communicate the control signal to the device to cause the device to have the setting selected or otherwise identified via the command priority layer 446. In this regard, the BMS controller 366 may be configured to control the device based on the priorities of the local setting and the setting from the cloud-based controller 502. The BSM controller 366 may be configured to control the device to have the highest priority setting—whether that setting is provided by the local client device 448 or the remote client device 506 of the cloud-based controller 502.

In some embodiments, the demand response layer 414 may be configured to provide a notification or message to the cloud-based controller 402. The demand response layer 414 may be configured to route the command via the communications interface 407 to the remote client device 506 via the message broker 510. The message broker 510 may receive the messages from the BMS controller 366 and route those messages to the remote client device 506. The remote client device 506 may update the user interface 508 to reflect or otherwise indicate receipt of the messages from the BMS controller 366. The demand response layer 414 may be configured to provide a status update message to the cloud-based controller 502. The status update message may be a message or other indication which indicates the status of the command from the cloud-based controller 502 (e.g., the remote client device 506). The status update message may be transmitted from the BMS controller 366 to the cloud-based controller 502 responsive to modification of settings for the device 504. The status update message may inform the cloud-based controller 502 (e.g., the remote client device 506) of the modified settings. In some embodiments, the status update message may indicate successful execution of a command from the cloud-based controller 502. In some embodiments, the status update message may indicate unsuccessful execution of a command from the cloud-based controller 502. In such embodiments, the status update message may further indicate a cause for the unsuccessful execution of the command (e.g., that a setting for the device 504 has a higher priority than the setting from the command). The remote client device 506 may be configured to receive the status update message from the BMS controller 366, and the remote client device 506 may update the user interface 508 to reflect the status update message.

Figure 6:
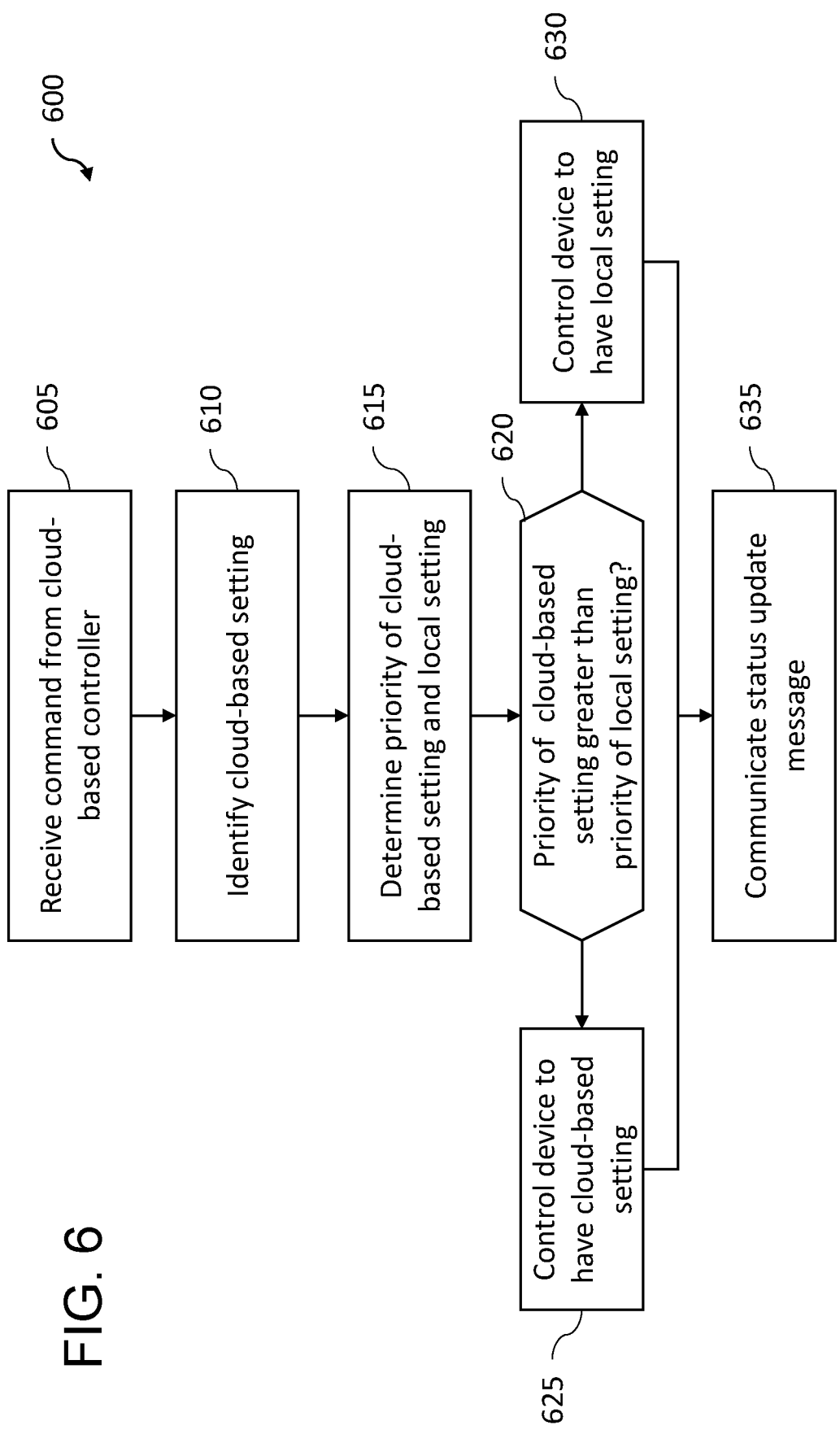
FIG. 6 is a flowchart depicting an example method of controlling a BMS, according to an exemplary embodiment.

Referring to FIG. 6, now that various embodiments of the system 500 have been described, a method of controlling a BMS is described with reference to FIG. 6. Specifically, FIG. 6 shows a flowchart depicting an example method 600 of controlling a BMS, according to an exemplary embodiment. The method 600 may be executed by any of the components described above, such as the cloud-based controller 502, BMS controller 366, etc., and components thereof.

At operation 605, a BMS controller 366 receives a command from a cloud-based controller 502. In some embodiments, the BMS controller 366 may receive the command via the communications interface 407. The communications interface 407 may be configured to receive commands from a cloud-based controller 502 and commands from a local client device 448. The command received at operation 605 may be a command for implementing a cloud-based setting of a device 504 for a first building subsystem 428. The commands from the cloud-based controller 502 and local client device 448 may be structured to modify one or more settings for a respective device of a building subsystem 428. The building subsystem 428 may be one of a plurality of building subsystems 428 for a building 10.

In some embodiments, the command from the cloud-based controller 502 may be structured according to a communications protocol. The cloud-based controller 502 may be configured to select a communications protocol in which to deliver the command to the BMS controller 366. The cloud-based controller 502 may be configured to structure commands in various different communications protocols. For instance, the cloud-based controller 502 may be configured to structure commands in different communications protocols based on the bandwidth of the BMS controller 366. The cloud-based controller 502 may be configured to structure commands in AMQP, MQTT, etc., based on the bandwidth of the BMS controller 366. The cloud-based controller 502 may be configured to select a communications protocol in which to structure the commands based on a communications protocol in which the BMS controller 366 accepts. The cloud-based controller 502 may communicate the command to the BMS controller 366 with the command structured in the selected communications protocol for the BMS controller 366.

The cloud-based controller 502 may be configured to transmit the command to the BMS controller 366 through a message broker 510. The message broker 510 may be communicably coupled to a remote client device 506 through an API 514. The message broker 510 may receive the command from the remote client device 506. The message broker 510 may include a listener 512 which detects commands and other structured data from the remote client device 506. The message broker 510 may include a message processor 516 which routes commands from the remote client device 506 to the BMS controller 366. The commands from the remote client device 506 may be structured to include identification information corresponding to the BMS controller 366, identification information corresponding to a device 504 in a building subsystem 428 which may be controlled by the BMS controller 366. The message broker 510 (e.g., the listener 512 of the message broker 510) may receive the commands from the remote client device 506, and the message broker 510 (e.g., the message processor 516 of the message broker 510) may identify the identification information corresponding to the target BMS controller 366, and pass, transmit, communicate, or otherwise deliver the command to the BMS controller 366.

The BMS controller 366 may include a communications interface 407. The communications interface 407 may act as or operate similarly to a gateway. The gateway may be configured as an interface for exchanging communications, commands, and other data between the cloud-based controller 502 (e.g., through the message broker 510 to the remote client device 506) and the local client device 448. The communications interface 407 may include a listener 518. The listener 518 may be similar in at least some aspects to the listener 512 of the message broker 510. The listener 518 may detect incoming messages and commands from the local client devices 448 and/or message broker 510.

At operation 610, the BMS controller 366 identifies a setting within the command from the cloud-based controller 502 (e.g., a cloud-based setting). As described above, the commands may include a setting for a device 504, identification information for the BMS controller 366, and identification information for the device 504. The BMS controller 366 may identify the cloud-based setting within the command. Each command may include a setting, and the setting may include or be assigned a corresponding priority. Each command may include a 16-segment array (structured similarly to table 1 above), with each cell in the array corresponding to a potential setting. Each cell may be assigned a particular priority. Where a cell includes a value other than null, the value may be the setting for the device. In some embodiments, the commands may include the cloud-based setting and a current setting assigned by the local client device 448 (e.g., local setting). The cloud-based setting and local setting may each have corresponding priorities, which are included in the command.

At operation 615, the BMS controller 366 determines a priority of the cloud-based setting and a priority of the local setting. In embodiments where the command from the cloud-based controller 502 includes two settings (e.g., the cloud-based setting and local setting), the BMS controller 366 may identify the priority of the respective settings. The BMS controller 366 may identify the priorities by identifying the location of the settings within the 16-segment array.

At operation 620, the BMS controller 366 determines whether the priority of the cloud-based setting is greater than the priority of the local setting. In this regard, the BMS controller 366 determines a priority of the cloud-based setting in relation to a priority of a local setting. Where the priority of the cloud-based setting is greater than the priority of the local setting, the method 600 may proceed to operation 625. Where the priority of the cloud-based setting not greater than (e.g., is less than or, in some implementations, equal to) the priority of the local setting, the method 600 may proceed to operation 630.

In some embodiments, the cloud-based setting is an optimization setting. The optimization setting may be a setting identified by the cloud-based controller 502 which optimizes various subsystems 428 within the building. The cloud-based controller 502 may identify an optimization setting through artificial intelligence. The cloud-based controller 502 may identify the optimization setting by applying a cost function based on various criteria. The criteria may include, for instance, a cost saved due to energy optimization achieved through automated control (e.g., via the remote client device 506). The criteria may include, for instance, criticality of the points or nodes associated with the devices 504 being controlled. The cloud-based controller 502 may assign a priority to the optimization setting. The cloud-based controller 502 may assign the priority by overwriting the optimization setting to the local setting, by passing a null value to the local setting, by assigning a higher priority than the local setting, etc. The BMS controller 366 may control the device 504 to have the optimization setting (e.g., operation 625), which may have a priority that is higher than the priority of the local setting. The BMS controller 366 may communicate the selected setting from the BMS controller 366 to the device 504, which causes the device 504 to have the selected setting.

As one example, an operator may manually control a temperature setting in the HVAC subsystem 438. The operator may write the temperature setting to a cell corresponding to manual operator priority (e.g., priority eight). The operator may inadvertently leave the temperature setting for an extended period (such as overnight). The cloud-based controller 502 may determine a duration in which the device 504 had the local setting (e.g., overnight, for an extended period, etc.) The cloud-based controller 502 may assign a null value to the manual operation priority based on the duration (e.g., that the temperature setting is maintained beyond hours of operation). In such embodiments, the BMS controller 366 may control the device 504 to have the cloud-based setting, as the cloud-based controller 502 assigned a null value to the manual operation priority—effectively overriding the local setting.

In some embodiments, the local setting may be an emergency setting. The emergency setting may be, for instance, a manual actuation of a valve which controls a fire damper in a fire safety subsystem 430. The local setting may be a setting written to a cell corresponding to a manual life-safety priority (e.g., by an operator of a local client device 488) or a cell corresponding to an automatic life-safety priority (e.g., by detection of a fire via a sensor in the fire safety subsystem 430). In such embodiments, the priority may be highest. As described in greater detail below, the BMS controller 366 may control the device 504 to have the local emergency setting, as that setting has the highest priority (e.g., operation 630). For instance, where the cloud-based setting is an optimization setting, the BMS controller 366 may control the device 504 to have the local emergency setting, as the local emergency setting has a higher priority than the optimization setting. The BMS controller 366 may include a BMS interface 409 which passes settings to devices within a building subsystem 428. The BMS controller 366 may communicate the selected setting from the BMS controller 366 to the device 504, which causes the device 504 to have the selected setting.

At operation 635, the BMS controller 366 communicates a status update message to the cloud-based controller. The status update message may cause the user interface 508 to be updated to reflect modification of the device 504. The status update message may indicate successful execution of the command from the cloud-based controller 502. The status update message may indicate the command from the cloud-based controller 502 was not executed. In such embodiments, the status update message may indicate why the command from the cloud-based controller 502 was not executed (e.g., that a setting had a higher priority than the priority of the cloud-based setting).

The BMS controller 366 may transmit the status update message to the cloud-based controller 502 via the message broker 510. The communications interface 407 may transmit the status update message from the BMS controller 366 to the message broker 510. The message broker 510 may include a listener 512 configured to detect the status update message from the communications interface 407 of the BMS controller 366. The message processor 516 may route the status update message to the remote client device 506. The remote client device 506 may update the user interface 508 to reflect the status update message.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the HVAC actuator and assembly thereof as shown in the various exemplary embodiments is illustrative only. Additionally, any element disclosed in one embodiment may be incorporated or utilized with any other embodiment disclosed herein. For example, the partial stroke test depicted in FIG. 16 may be executed by receiving instructions via the UART test system 1400, according to some embodiments, or may be executed by receiving instructions via the NFC device 518 according to some embodiments. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A building management system, the system comprising:
 a controller including a processing circuit comprising a processor and memory, the memory storing instructions that, when executed by the processor, cause the processor to perform operations, the operations comprising:
 receiving, from a cloud-based controller, a command for implementing a cloud-based setting for one or more building devices;
 determining a priority of the cloud-based setting in relation to a priority of a local setting for the one or more building devices; and controlling the one or more building devices based on the priority of the cloud-based setting in relation to the priority of the local setting.

2. The building management system of claim 1, wherein the local setting is an emergency setting, and wherein controlling the one or more building devices based on the priority of the cloud-based setting in relation to the priority of the local setting comprises:
  controlling the one or more building devices to have the local emergency setting, the local emergency setting having a higher priority than the priority of the cloud-based setting.

3. The building management system of claim 1, wherein the local setting is an emergency setting and the cloud-based setting is an optimization setting, and wherein controlling the one or more building devices based on the priority of the cloud-based setting in relation to the priority of the local setting comprises:
  controlling the one or more building devices to have the local emergency setting, the local emergency setting having a higher priority than the optimization setting.

4. The building management system of claim 1, wherein the cloud-based setting is an optimization setting, and wherein controlling the one or more building devices based on the priority of the cloud-based setting in relation to the priority of the local setting comprises:
  controlling the one or more building devices to have the optimization setting, the optimization setting having a higher priority than the priority of the local setting.

5. The building management system of claim 4, wherein controlling the one or more building devices based on the priority of the cloud-based setting in relation to the priority of the local setting comprises:
  determining a duration in which the one or more building devices had the local setting;
  assigning, based on the duration, a null value to the local setting; and
  controlling the one or more building devices to have the cloud-based setting.

6. The building management system of claim 1, wherein the controller further comprises a gateway configured to listen for commands from a message broker, the cloud-based controller routing the commands to the controller via the gateway through the message broker, and wherein the operations further comprise:
  communicating a status update message to the gateway for transmission to the cloud-based controller via the message broker, the status update message causing a user interface corresponding to the cloud-based controller to be updated to reflect modification of the one or more building devices.

7. The building management system of claim 6, wherein controlling the one or more building devices based on the priority of the cloud-based setting in relation to the priority of the local setting comprises controlling the one or more building devices to have the local setting, and wherein the status update message indicates that the cloud-based setting was not executed because the priority of the local setting is greater than the priority of the cloud-based setting.

8. The building management system of claim 6, wherein controlling the one or more building devices based on the priority of the cloud-based setting in relation to the priority of the local setting comprises controlling the device to have the cloud-based setting, and wherein the status update message indicates successful execution of the cloud-based setting.

9. The building management system of claim 1, wherein the controller is located at a building which includes one or more building subsystems including the one or more building devices.

10. The building management system of claim 1, wherein the controller comprises the communications interface which receives the command from the cloud-based controller.

11. The building management system of claim 1, wherein the one or more building devices comprise a plurality of building devices of a plurality of building subsystems, and wherein the controller is configured to control devices of the respective building subsystems based on priorities of cloud-based settings in relation to priorities of local settings.

12. A method of controlling a device of a building management system, the method comprising:
  receiving a command for implementing a cloud-based setting of one or more building devices, the one or more building devices having a local setting;
  determining a priority of the cloud-based setting in relation to a priority of the local setting; and
  controlling one or more building devices based on the priority of the cloud-based setting in relation to the priority of the local setting.

13. The method of claim 12, wherein the local setting is an emergency setting, and wherein controlling the one or more building devices based on the priority of the cloud-based setting in relation to the priority of the local setting comprises:
  controlling the one or more building devices to have the local emergency setting, the local emergency setting having a higher priority than the priority of the cloud-based setting.

14. The method of claim 12, wherein the local setting is an emergency setting and the cloud-based setting is an optimization setting, and wherein controlling the one or more building devices based on the priority of the cloud-based setting in relation to the priority of the local setting comprises:
  controlling the one or more building devices to have the local emergency setting, the local emergency setting having a higher priority than the optimization setting.

15. The method of claim 12, wherein the cloud-based setting is an optimization setting, and wherein controlling the one or more building devices based on the priority of the cloud-based setting in relation to the priority of the local setting comprises:
  controlling the one or more building devices to have the optimization setting, the optimization setting having a higher priority than the priority of the local setting.

16. The method of claim 12, wherein controlling the one or more building devices based on the priority of the cloud-based setting in relation to the priority of the local setting comprises:
  determining a duration in which the device had the local setting;
  assigning, based on the duration, a null value to the local setting; and
  controlling the device to have the cloud-based setting.

17. The method of claim 12, wherein the command is received from the cloud-based controller via a communications interface by a building management system (BMS) controller.

18. A method of controlling a building management system from a remote location, the method comprising:
  receiving, via a user interface, a selection for modifying a setting of one or more building devices;

communicating a command corresponding to the selection to a controller associated with the one or more building devices, the controller receiving the command and selectively executing the command to modify the setting for the one or more building devices based on a priority of the setting from the command in relation to a priority of a local setting for the one or more building devices;

receiving, from the controller, a status update message, the status update message indicating whether or not the command corresponding to selection was executed by the controller; and updating the user interface based on the status update message.

19. The method of claim 18, wherein the local setting is an emergency setting having a higher priority than the setting from the command, the status update message indicates the command was not executed by the controller, and wherein updating the user interface based on the status update message comprises:

updating the user interface to indicate the command was not executed because the priority of the local setting is greater than the priority of the setting from the command.

20. The method of claim 18, wherein communicating the command comprises communicating the command to a message broker for transmission to a gateway for the controller.

* * * * *